United States Patent [19]

Farley et al.

[11] 4,216,594
[45] Aug. 12, 1980

[54] PSYCHOTHERAPEUTIC TESTING GAME

[76] Inventors: Cheryl Farley; Ira P. Farley, both of 99 Harold St., Staten Island, N.Y. 10312

[21] Appl. No.: 955,969

[22] Filed: Oct. 30, 1978

[51] Int. Cl.² ............................................... G09B 19/00
[52] U.S. Cl. .................................... 35/22 R; 273/243; 273/249
[58] Field of Search ..................... 273/243, 249, 248; 35/22

[56] References Cited

U.S. PATENT DOCUMENTS

| | | | |
|---|---|---|---|
| 1,635,734 | 7/1927 | Ziegler | 273/249 |
| 2,232,055 | 2/1941 | Davis | 273/243 |
| 3,779,557 | 12/1973 | Kritzberg et al. | 35/22 R |
| 3,831,946 | 8/1974 | Denalsky | 273/249 |
| 4,029,320 | 6/1977 | Hausman | 35/9 R |
| 4,090,717 | 5/1978 | Rossetti | 35/9 R |
| 4,109,918 | 8/1978 | Mele et al. | 273/243 |
| 4,124,214 | 11/1978 | Pavis | 35/22 R |

Primary Examiner—John W. Shepperd
Attorney, Agent, or Firm—Feldman & Feldman

[57] ABSTRACT

A psychotherapeutic testing game comprises a game apparatus for providing a game playing atmosphere between a tester and a player. A chance selection device is associated with the game apparatus for selecting the game participation requirements of a player. A plurality of cards for selection by the game selection device contains information to elicit a personal psychological response of a player whereby the player upon giving the response is given an award operably associated with the game apparatus.

15 Claims, 4 Drawing Figures

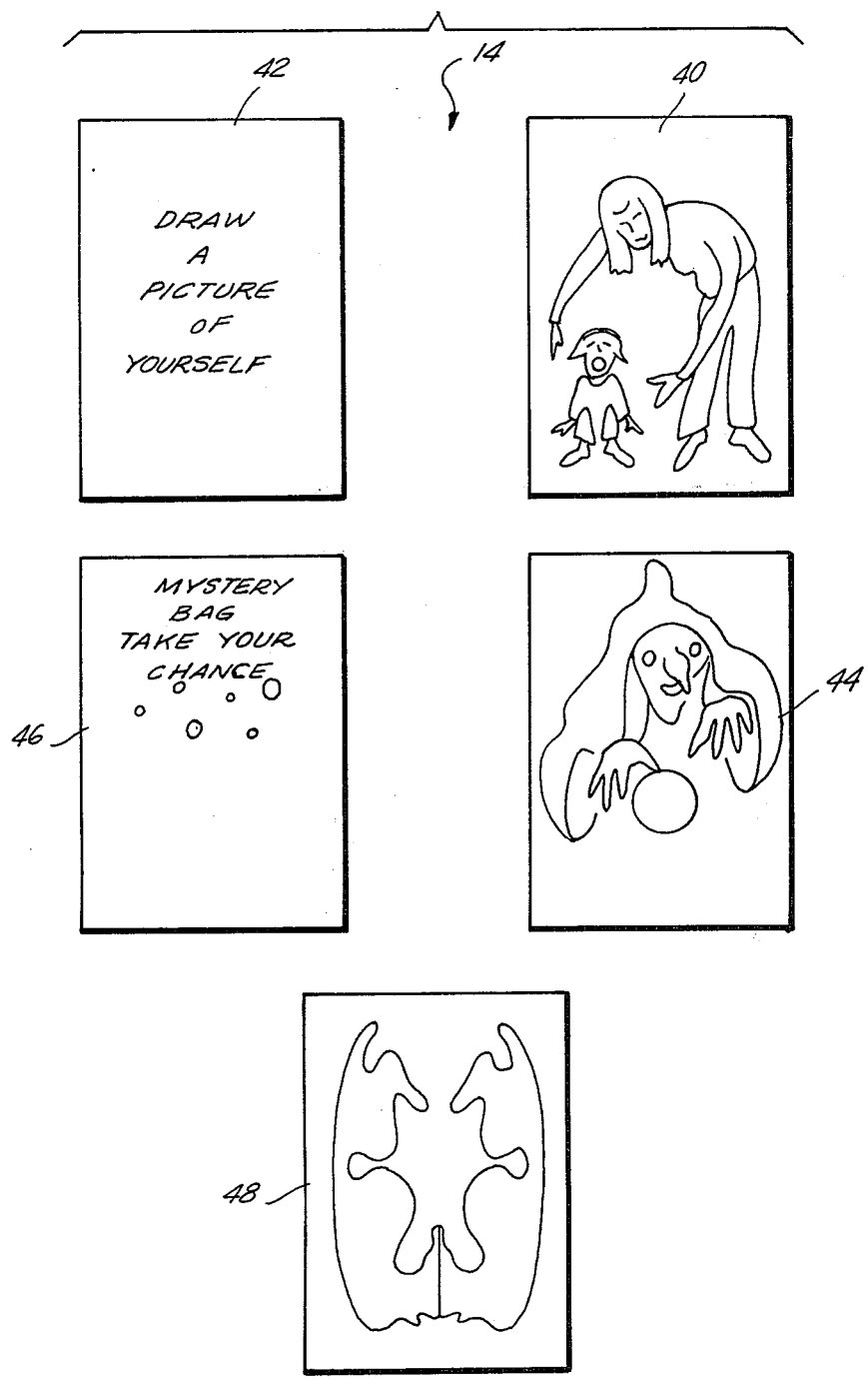

PSYCHOTHERAPEUTIC TESTING GAME

BACKGROUND OF THE INVENTION

While the invention is subject to a wide range of applications, it is especially related to therapeutic applications and will be particularly described in that connection.

In the area of child psychotherapy, a problem is often created in dealing with the child because the therapist is often seen as the ultimately powerful adult who has been called in because the child has been "bad". The child may make a tremendous effort to hide all evidence of the problem and resists involvement in the therapeutic situation by being uncooperative, inhibited, shy, withdrawn, etc. In this way, the child patient prevents the therapist from satisfactorily communicating and helping the child. In therapy, various types of non-verbal communication such as for example, play, drawing, and painting may be as meaningful as the spoken word. Play is one of the child's natural modes of communication and the fantasies that can be evoked while involved in play can provide significant information about the psychological processes that are at the roots of the child's problems. The present invention provides a desirable approach in working with a younger age group (from approximately 6–14 years old) by combining the creative aspects of play and art therapy with a structured game. The resultant therapeutic creative game is used as a method of engaging the withdrawn or uncooperative child into therapeutic involvement and simultaneously serving as a diagnostic aid for the therapist.

In the past, a number of patents such as U.S. Pat. No. 4,013,294 to Smeda; U.S. Pat. No. 3,815,919 to Cain; and U.S. Pat. No. 3,124,358 to Weedman have illustrated various types of educational and psychological games.

It is an object of the present invention to provide a creative, projective play game for engaging the withdrawn or uncooperative child into therapeutic involvement.

It is a further object of the present invention to provide a creative, projective play game which is a diagnostic aide for a therapist.

It is a still further object of the present invention to provide a creative projective game to stimulate insight, facilitate communication, to learn new skills, and to aid in personal growth.

It is an additional object of the present invention to provide a creative projective play game which is relatively inexpensive to manufacture.

SUMMARY OF THE INVENTION

In accordance with the present invention, there is disclosed a psychoterapeutic testing game comprising game apparatus for providing a game playing atmosphere between a tester and a player. A chance selection device is associated with the game apparatus for selecting the game participation requirements of a player. A plurality of cards for selection by the game selection device contains information to elicit a personal psychological response of a player. The player, upon giving the response, is given an award operably associated with the game apparatus.

For a better understanding of the present invention together with other and further objects thereof, reference is made to the following description, taken in connection with the accompanying drawings, while its scope will be pointed out in the appended claims.

BRIEF DESCRIPTION OF THE DRAWINGS

FIG. 3 is an illustration of different categories of cards in accordance with the present invention.

DESCRIPTION OF THE PREFERRED EMBODIMENTS

In accordance with the present invention, a psychotherapeutic testing game comprises a game apparatus 10 for providing a game playing atmosphere between a tester and a player. A chance selection device 12 is associated with the game apparatus for selecting the game participation requirements of a player. A plurality of cards 14 for selection by the game selection device contains information to elicit a personal psychological response of a player. Upon giving the response, the player is given an award operably associated with the game apparatus. Although the game, as illustrated and explained is for therapeutic testing of children, it may be used for people of any age category.

Figure 1:
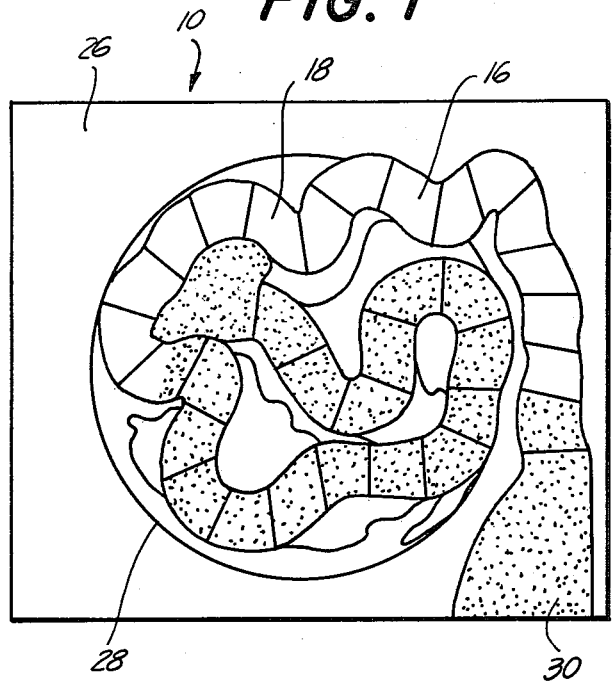
FIG. 1 is an illustration of a game board in accordance with the present invention.

Referring to FIG. 1, there is illustrated a game board apparatus 10 including a playing surface 26 with a circular image 28, such as for example a mandala, centrally located thereon. A playing path 16 begins at the "Beginning" at a side 30 of the playing surface 26 and proceeds into the circular image 28 until it ends at "Rainbow's End." The playing path 16 may be divided into any desired number of continuous segments 14 such as 33 segments. The setting of the game is a jungle motif. This represents a place where vegetation thrives free from any control or cultivation. Interspersed within the heavy green foliage are water and earthen areas which represent the various obstacles and dangers that may be encountered along the path. The playing path 12 on which the players move is primarily located within the confines of the circular image 28 and although not indicated on the drawings, begins with dark hues of the spectrum and becomes lighter and more intense in color as the player approaches the core or end of the game path. It is further within the scope of the present invention to provide a game board apparatus of any desired shape, color, or configuration. The primary concern in providing the board is to create a game playing atmosphere between the player and the therapist.

Figure 2:
FIG. 2 is an illustration of several movable playing elements.

The movable playing elements 32 may be comprised of different types of animal playing pieces as illustrated in FIG. 2. Although an eagle and an elephant are represented, it is within the scope of the present invention to use any type of animal or any shaped piece as desired. The symbolic classification of animals is often related to four elements. The playing pieces may fall into the categories of amphibious animals (associated with water); reptiles (associated with earth); birds (associated with air); and mammals (associated with fire). A variety of information on each animal is included within the game to provide the therapist with a wide range of meanings applicable to possible psychological traits of the player who choses that specific animal. For example, the eagle is characterized by a strongly hooked beak, great talons, and keen vision. It is known for its powerful, stately flight. They may be symbolic of spiritalization and the represent spirits or angels, supernatural aid, thoughts and flights of fancy.

The elephant is characterized by massive size, great strength, a disproportionately large head, grasping trunk, and short neck. It is alleged to have a high intelligence as well as a retentive memory. It has a keen sense of smell, but vision and hearing are poorly developed. They are looked upon today as obvious symbols of clumsiness. The elephant is a symbol of strength and of the power of the libido. Because of their shape and color, they are regarded as symbols of clouds. Thus, every animal can be examined and used to suggest possible indications of a child's behavior in real life or in fantasy.

Figure 4:
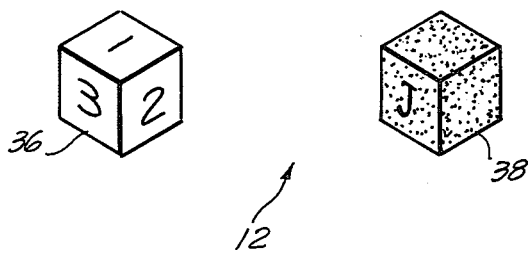
FIG. 4 is an illustration of dice for selecting numbers and cards.

A chance selection device 12 which is associated with the game apparatus 10 for selecting the game participation requirements of a player may be comprised of two dice as illustrated in FIG. 4. Once of the dice is a random number selector 36 which is used to indicate the number of segments on the playing path 16 to be transversed by the player. This die consists of numerals on each side ranging from 1 through 6.

The other die is a card selector device 38 which has a different color on five sides (red, green, yellow, purple, blue) and a "J" representing a Joker on the sixth side. When this die is thrown, it indicates which card pile the player must select from as will be further explained. Although dice have been illustrated as the desired change selection device 12, it is within the scope of the present invention to use any desired selection apparatus such as for example a spinner on a card divided into color or numbered segments. Referring to FIG. 2 there is illustrated an example of cards which are selected by the card selector device 38 and which contains information to elicit a personal psychological response of a player whereby the player upon given the response is given an award operable associated with the game apparatus as will be further explained. The cards are divided into six different groups, five of which are distinguished by color (yellow, blue, green, red, and purple) on one side of the card and a sixth group which has a letter designation "J", on one side of the card. Note that the colors and the letter designation on the card selector device 38 corresponds to the cards. Of course, any desired colors or other designations may be used as required.

The five different groups of cards which are distinguished by color are further subdivided into four categories; emotional, creativity; imagination/fantasy, and reality for eliciting corresponding psychological response in accordance with each category.

The card 40 of FIG. 3 is in the emotional category. It may be comprised of pictures which are highly contrasted in black, white, and shaded areas and are totally comprised of visual imagery designed to stimulate emotional affects. They are provocative representations of emotional situations and roles which would be particularly relevant to players such as children. The imagery in this category have predominantly human stimuli but are also interspersed with some animal figures. The animals may be used on cards that are considered to be more anxiety provocating to lessen the resistance of the player and thus facilitate the projection of the player's feelings. Due to the difference of opinion regarding the productivity in human versus non-human stimuli, it is within the scope of the present invention to use both types of stimuli in the emotion cards. The emotion card 40 illustrated in FIG. 3 shows a female figure reaching for a child and is simply one example of a wide range of topics that may be chosen for preconceived ideas about what children deal with most in therapy. The emotion cards 40 are designed to give the child an opportunity for identification and verbalization of a wide range of feelings allowing for the release of tension, unconscious conflicts, and to thereby encourage expression in a socially acceptable fashion. They may also help the child realize that some of his unacceptable thoughts and fantasies may be brought into the open and thus enable him to discover that constructive use can be made of one's emotional involvement.

The creativity category of cards such as card 42 as shown in FIG. 3 may have directions and requests to stimulate a creative response by the player which encompasses the exploration of feelings and fantasy through role playing and drawing. Thus, this category including both non-verbal and verbal forms enhance the child's ability to break through the often stereotyped barriers of purely verbal communication. The resulting creative process may serve as the basis for motivation to delve deeper in exploration and discovery. The category is included to place an emphasis on increasing the child's awareness through a variety of creative and perceptual experiences. The act of creation forms an integral part of the process of personal growth, development, and the establishment of one's personal identity. By concretizing these experiences, feelings, fantasies, wishes, fears, and hopes there develops an increasing awareness and positive attitude about one's self.

The imagination/fantasy category includes cards, such as card 44 in FIG. 3, which illustrates a combination of questions and pictures stimulating the creative imagination abilities in the player. The questions are designed to stimulate as well as challenge the child's imagination to produce new ideas and come to terms with his central conflicts through symbolic mental imagery. The cards of this category provide the spark to ignite and bring to consciousness those areas which were previously dark and unexplored, but rich in imagery.

The reality category of cards exemplified by card 46 in FIG. 3 includes cards having a combination of questions and pictures stimulating responses in the here and now of the player. Some of the issues to be covered are body image, control, ventilation, and sensory exploration. The cards which require sensory, tactile and motor activities allow for expression of need through play. One example of such a card is the mystery bag card 48. An indication of ego functioning can be seen through the range of the child's responses in this category. It will give the therapist/tester the opportunity to note how reality situations are handled and whether there are any distortions in the child's reactions. Note that the mystery bag may contain a plurality of tactile items such as for example, a dolls bottle, sponge, belt buckle, etc. as chosen by the therapist.

The sixth group of cards called the "Joker" and designated by a "J" on one side of the card consists entirely of ink blots, some black and white, and others colored. The Joker card 48, as illustrated in FIG. 3, is used to stimulate the player to say as much about the form on the card as possible.

Token awards such as for example, colored chips have a reinforcing effect and serve as an external incentive award to strengthen the motivation for actively participating in the game and performing the desired behavior. These chips (not illustrated) may have three assigned values according to the color such as green-1 point, red-2 points, and blue-3 points. They are held in the "bank" by the therapist/tester and awarded to the player according to the player's response to the directions on the cards as will be explained. In addition, a reward box containing numerous prizes may be used as a "back up reinforcer" by providing the player with an opportunity to exchange the accumulated chips for a prize and thereby maintain the conditioning reinforcing value of the tokens.

In administering the psychotherapeutic testing game of the present invention, the therapist/tester takes the role of being the "banker". Each of the different categories of cards have a different award value which is based on the difficulty and general reluctance of a player to respond to the information contained on that card. The amount of points that are rewarded for responding to a card is determined by the banker. If full elaboration on a card is given, the player will be awarded the maximum amount of points and given a corresponding colored chip. However, if only a partial answer is given, the banker determines what the partial point payment should be and awards the proper token chip accordingly. The category of cards concerning emotion consist of a set of pictures. The player is told by the therapist/tester, upon selecting such a card, to make up a story about the picture, relate what is happening, tell what the subjects are thinking and feeling and what the player anticipates will happen in this story. The therapist may also analyze the character with whom the player has identified himself. If the player answers any part of the above questions, he should be awarded with one point while full elaboration is awarded with 2 points.

In the category of creativity, the cards consist of sets of directions and requests that requires the player to answer a question and follows a direction. Some of the cards may require role playing while others require drawing. If the player partially fulfills the requirements, the tester awards one point while full completion of the card is worth 2 points.

The category of imagination/fantasy requires the player to use his imagination to create different situations as directed by the cards. The therapist awards one point for the completed card. The category of reality consists of cards that attempt to determine the child's level of reality functioning. A satisfactory answer to a card in this category is awarded one point. The category of cards called "Joker" consist of a series of ink blots in black and white and/or color. When a player selects this card, he is instructed to tell what he sees and that he may see more than one thing. The player should respond by saying whatever comes to his mind and further say as much about the card as possible. The therapist should clarify which image is being referred to by asking the player to point to it on the card. Further questions by the therapist require individual judgement in determining what is necessary. Full elaboration in the Joker category of cards is awarded three points.

The therapist also attempts to clarify the total picture of ego functioning of the player by watching the non-verbal activity throughout the game such as tempo, smoothness, or jerkiness of energy discharge, rhythms and sequence of activity and passivity, control, and impulsivity. Observation should be made of the different modalities of response such as for example, visual, verbal, auditory, and tactile. Also the manner in which the individual approaches and gets involved in the game may give an indication of where psychological damage may have occured.

In administering the game, the therapist first gives general instructions on the play of the game. For instance there are two dice, one numbered 1 to 6 and the other having 6 different colored faces, one of which includes a "J". When the dice are rolled, the die with the number determines the number of moves and the die with the colored faces determines from which group of cards is to be chose. If several players are playing together, they each roll the numbered die and the one rolling the highest number gets to choose his movable playing element 32 first and becomes the first player to begin all phases of the game. The remaining players then choose their respective game pieces in clock-wise rotation and maintain this order throughout. After all the players have chosen their animals, the therapist states that the game has begun and each player is asked about his game piece. A suitable response is worth one point. The therapist may ask each player in rotation questions such as what he likes about the animal, would he like to be it, and how he feels about that animal. Then each player puts his play element on the first segment 14 called "Beginning". The first player throws both dice and moves the number of spaces indicated on the numbered die 36 and choses the top card from the color stack corresponding with the color on the multi-color die 38. Upon the selection of a card by a player, the therpist announces the maximum amount of points to be gained for a complete response. This will increase the player's initiative to respond and achieve the maximum amount of points. After a player responds to the information on the particular card, the therapist awards him with a token chip of a color corresponding to the number of points that the player is to be awarded. The game ends as soon as someone reaches "Rainbow's End". At that point, the remaining players are allowed to finish the rotation until the last person completes his turn. The points are then counted up and the person with the highest point total wins the game. In the event that the game is used with an individual child, the tokens may then be exchanged for a prize.

One skilled in the art will realize that there has been disclosed a psychotherapeutic testing game that engages the withdrawn or uncooperative child into therapeutic involvement, provides a diagnostic aid for a therapist, stimulates insight, facilitates communication, teaches new skills and aids in personal growth, and is relatively inexpensive to manufacture.

While there has been described what is at present considered a preferred embodiment of the invention, it will be obvious to one skilled in the art that various changes and modifications may be made therein without departing from the invention, and it is, therefore, aimed in the appended claims to cover all such changes and modifications as followed in the true spirit and scope of the invention.

What is claimed is:

1. A psychotherapeutic testing game comprising:
 a. game means for providing a game playing atmosphere between a tester and a player; said game means including a playing surface having a playing path divided into a plurality of progressive segments, and a plurality of movable playing elements to be moved by a player in the segments along the path;

b. a plurality of cards for a plurality of psychological testing categories and containing information to elicit a personal phychological response of a player corresponding to the selected category whereby the player upon giving said response is given an award commensurate with the selected category; and c. chance selection means being integral to the game and comprising first selection means for determining a category of said plurality of psychological testing categories and second selection means being random number selection means to indicate the segments to be moved in said path, whereby operation of said first and second means by the player is in game play so as to mask the effect of providing psychotherapeutic responses to said cards.

2. The psychotherapeutic testing game as defined in claim 1 further characterized in that said playing surface includes a substantially circular image thereon and said playing path begins on one side of said playing surface and proceeds to the end of the path in said circular image.

3. The psychotherapeutic testing game as defined in claim 2 further characterized in that said segments are each a different color beginning with dark hues of the spectrum and becoming lighter and more intense in color near the end of the playing path.

4. The psychotherapeutic testing game as defined in claim 1 further characterized in that said movable playing elements are in the shape of different animals wherein each animal represents different psychological characteristics.

5. The psychotherapeutic testing game as defined in claim 1 further characterized in that said random number selector means is a die having one of six numbers ranging from one to six indicated on each side.

6. The psychotherapeutic testing game as defined in claim 1 further characterized in that said first means is a die having one of five different colors indicated on five sides and a letter designation on a sixth side whereby a card is selected corresponding to one side of the die.

7. The psychotherapeutic testing game as defined in claim 1 further characterized in that said plurality of cards are divided into six different groups wherein, five of said groups are differentiated by different colors on one side of said cards and the sixth of said groups has a letter designation on one side of said cards.

8. The psychotherapeutic testing game as defined in claim 7 wherein said five different groups are subdivided into four categories of emotion, creativity, imagination/fantasy and reality for eliciting corresponding psychological responses in accordance to each category.

9. The psychotherapeutic testing game as defined in claim 8 further characterized in that said emotion category includes said cards having a picture in an emotion category for stimulating emotional affects in said player whereby full elaboration of said emotional effect as evaluated by said tester provides said player with an award of a first value.

10. The psychotherapeutic testing game as defined in claim 9 further characterized in that said creativity category includes said cards having directions and requests stimulating a creative response by said player whereby completion of said directions and requests as evaluation by a tester provides the player with an award of said first value.

11. The psychotherapeutic testing game as defined in claim 10 further characterized in that imagination/fantasy category includes cards having a combination of questions and pictures stimulating the creative imagination abilities in the player whereby full elaboration of said imagination as evaluated by said tester provides the player with a second award having a value less than said first award.

12. The psychotherapeutic testing game as defined in claim 11 further characterized in that said reality category includes said cards having a combination of questions and pictures stimulating responses in the here and now of the player whereby a satisfactory answer as evaluated by the tester provides the player with said second award.

13. The psychotherapeutic testing game as defined in claim 12 further characterized in that said six of the different groups include cards having a form created by a series of ink blots for stimulating the player to say as much about the form on the card as possible whereby full elaboration as evaluated by the tester provides the player with a third award having a value greater than the value of said first award.

14. The psychotherapeutic testing game as defined in claim 12 further characterized in that said reality category includes a mystery bag containing a plurality of tactile items for sensory exploration by said player in accordance with the questions of said reality category.

15. The pyschotherapeutic testing game as defined in claim 1, wherein said first and second selection means are dice which are thrown by the player.

* * * * *